United States Patent [19]
Nakano

[11] 3,710,234
[45] Jan. 9, 1973

[54] VOLTAGE CHANGING RATE DETECTING CIRCUIT

[75] Inventor: Yoshiaki Nakano, Gifu-shi, Japan

[73] Assignee: Nippondenso Kabushiki Kaisha, Aichi-ken, Japan

[22] Filed: Feb. 18, 1971

[21] Appl. No.: 116,344

[30] Foreign Application Priority Data

Feb. 23, 1970 Japan ..............................45/15459

[52] U.S. Cl. ...................323/100, 330/100, 330/110
[51] Int. Cl. ..........................................G01r 19/12
[58] Field of Search.....323/16, 19, 22 R; 330/98, 97, 330/100, 110

[56] References Cited

UNITED STATES PATENTS

| | | | |
|---|---|---|---|
| 3,550,117 | 12/1970 | Smith | 330/98 X |
| 3,577,090 | 5/1971 | Montgomery, Jr. | 330/110 X |
| 3,441,863 | 4/1969 | Moriyasu | 330/98 X |
| 3,470,457 | 9/1969 | Howlett | 323/22 T |

Primary Examiner—A. D. Pellinen
Attorney—Cushman, Darby & Cushman

[57] ABSTRACT

A voltage changing rate detecting circuit includes an integrator and a comparator, in which an input signal voltage is applied to one of the input terminals of the comparator while an output voltage of the integrator is applied to the other input terminal thereof, and the output voltage of the comparator is negatively fed back to said integrator, to thereby detect the voltage changing rate of the input signal voltage.

5 Claims, 4 Drawing Figures

PATENTED JAN 9 1973  3,710,234

INVENTOR
Yoshiaki NAKANO

BY Cushman, Darby & Cushman
ATTORNEYS

VOLTAGE CHANGING RATE DETECTING CIRCUIT

The present invention relates to a circuit for detecting the voltage changing rate of an input signal voltage.

Figure 1:
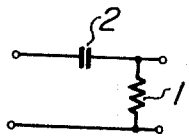
Figure 2:
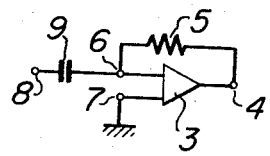

The conventional circuits for detecting the voltage changing rate are as shown in FIGS. 1 and 2. The circuit shown in FIG. 1 is what is called a differentiating circuit comprising a resistor 1 and capacitor 2, in which the regulation of an input signal voltage is detected by measuring the value of an output voltage in the form of impulses across the resistor 1.

The circuit shown in FIG. 2 is also of a differentiation type and signals are negatively fed back from an output terminal 4 of an operational amplifier 3 to an inverting input terminal 6 by means of a resistor 5. A non inverting input terminal 7 is grounded. Further, a capacitor 9 is inserted between an input terminal 8 and the inverting input terminal 6. It is well known that when signals are negatively fed back through the resistor 5 from the output terminal 4 of the operational amplifier 3 to the inverting input terminal 6, the potential of the inverting input terminal 6 becomes equal to that of the non inverting input terminal 7, and as a result the potential at the inverting input terminal 6 becomes almost zero. Therefore, a current in accordance with the variations in the input signal voltage to the input terminal 8 flows into the operational amplifier 3 through the capacitor 9 and resistor 5, so that a voltage corresponding to the changing rate of the input signal voltage is generated at the output terminal 4.

The disadvantage of the conventional circuit shown in FIG. 1, however, is a delay in response caused by the time constant due to the resistor 1 and the capacitor 2, and this delay in response offers a problem in some cases. On the other hand, the circuit of FIG. 2 is disadvantageous in that since the inverting input terminal 6 is connected with the input terminal 8 through the capacitor 9, noises are liable to develop and the operation is unstable.

Accordingly, it is an object of the present invention to provide a voltage changing rate detecting circuit comprising an integrator and a comparator, in which an input signal voltage is applied to one of the input terminals of the comparator while an output voltage of the integrator is applied to the other input terminal, and an output voltage of the comparator is negatively fed back to the integrator.

As described above, the device according to the present invention has an integrator and a comparator, and an input signal voltage is applied to an input terminal of the comparator while applying an output voltage of the integrator to the other output terminal of the comparator so that an output voltage of the comparator is negatively fed back to the integrator. For this reason, no capacitor has to be connected with the input terminal unlike the conventional circuits, and at the same time an input impedance can be made large, whereby stable operations are made possible without any erroneous operation which might otherwise be caused by noises. In addition, unlike the differentiating circuit consisting of a combination of a capacitor and a resistor, no delay in response develops in detecting the changing rate of the input signal voltage.

Another object of the present invention is to provide a voltage changing rate detecting circuit comprising an integrator and a comparator, in which an input signal voltage is applied to one of the input terminals of the comparator while an output voltage of the integrator is applied to the other input terminal thereof, and an output voltage of one polarity of the comparator and a separate constant voltage are applied to the input terminal of the integrator.

As described above, the device according to the present invention has an integrator and comparator, and an input signal voltage is applied to one of the input terminals of the comparator while applying an output voltage of the integrator to the other input terminal thereof, so that an output voltage of one polarity of the comparator and a separate constant voltage are applied to an input terminal of the integrator. As a consequence, not only is it possible to obtain the same effect as the above-mentioned first invention, but more than a certain level of the changing rate of the input signal voltage can always be detected.

Figure 3:
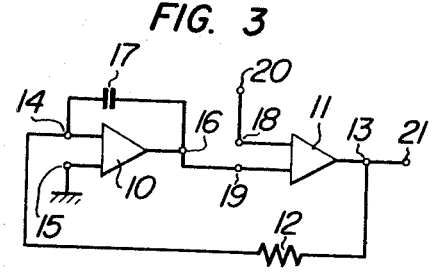
Figure 4:
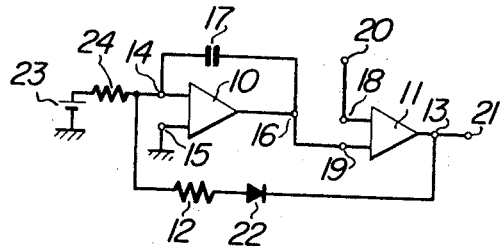

The above and other objects, features and advantages will be made apparent by the detailed description taken in conjunction with the accompanying drawings, in which;

FIGS. 1 and 2 are electrical wiring diagrams showing conventional voltage changing rate detecting circuits; and FIGS. 3 and 4 are electrical wiring diagrams showing voltage changing rate detecting circuits embodying the present invention.

The present invention will now be described with reference to its embodiments. Referring first to a first embodiment as shown in FIG. 3, numeral 10 shows an operational amplifier used as an integrator, numeral 11 a comparator using an operational amplifier as a differential amplifier, numeral 12 a resistor for a negative feedback inserted between an output terminal 13 of the comparator 11 and an inverting input terminal 14 of the integrator 10, numeral 15 a grounded non inverting input terminal of the integrator, numeral 16 an output terminal of the integrator 10, numeral 17 a capacitor for negative feedback inserted between the output terminal 16 of the integrator 10 and the inverting input terminal 14, numerals 18 and 19 inverting and non inverting input terminals of the comparator 11 respectively, and numerals 20 and 21 input and output terminals of the circuit according to the present invention.

The operation of the first embodiment of the present invention with the above-mentioned construction will be explained below.

It is assumed that an input signal voltage applied to the input terminal 20 is equal in value to an output voltage generated at the output terminal 16 of the integrator 10. When the input signal voltage applied to the input terminal 20 begins to increase, the potential at the inverting input terminal 18 of the comparator becomes higher than that at the non inverting input terminal 19, and as a result a negative output voltage is produced at the output terminal 13 which has been at zero potential. Consequently, the potential at the terminal 14 also becomes negative as compared with that at the terminal 15, the latter being grounded and at zero potential, and thus the output voltage of the integrator 10 increases until it becomes equal to the input signal voltage at terminal 20. Therefore, the increase in the potential at the output terminal 16 causes a current to flow from the integrator 10 into the comparator 11 through the output terminal 16, capacitor 17 and resistor 12. If this closed loop responds correctly, the output voltage of the integrator 10 varies according to the input signal voltage. In other words, a current corresponding to the regulation of the input signal voltage flows in the capacitor 17 and resistor 12, and therefore the value of a voltage which appears at the output terminal 13 of the comparator 11, and hence at the output terminal 21 of this device, is determined by the resistance value of the resistor 12 and the current which varies according to the changing ratio of the input signal voltage. The voltage changing ratio can be detected at the output terminal 21.

When, on the other hand, the input voltage at the input terminal 20 begins to decrease, a positive output voltage is produced at the output terminal 13 causing the potential at the terminal 14 to be positive with respect to that at the terminal 15. According,, the potential at the output terminal 16 decreases and a current flows from the comparator 11 into the integrator through the terminal 13, resistor 12 and capacitor 17.

The second embodiment of the present invention will be described below with reference to FIG. 4. In this figure, like reference numerals indicate like parts as shown in FIG. 3. Numeral 22 shows a diode inserted between the resistor 12 and the output terminal 13 of the comparator 11. Numeral 23 is constant voltage source, or a battery which supplies a predetermined voltage, with its negative terminal grounded, while the resistor 24 is inserted between its positive pole and the inverting input terminal 14 of the integrator 10.

The operation of the second embodiment as constructed above will be explained below. As compared with the first embodiment, the second embodiment includes additionally a battery 23, resistor 24 and diode 22. Therefore, even where the potentials of the input terminal 20 and the output terminal 16 of the integrator 10 are equal to each other, a current flows from the battery 23 into the output terminal 13 of the comparator 11 through the resistors 24 and 12, and diode 22. Since the inverting input terminal 14 of the integrator 10 is arranged almost zero in potential, the potential of the output terminal 13 is negative and lower than that of the terminal 14 due to the voltage drop in the resistor 12, neglecting the voltage drop in the diode 22. If the input signal voltage applied to the input terminal 20 is increased and a voltage at the non inverting input terminal 19 of the comparator 11 becomes lower than the one at the inverting input terminal 18, a negative output voltage appears at the output terminal 13, and hence the potential of the output terminal 13 becomes further negative. The current from the battery 23 into the input terminal 13 increases and hence the voltage drop in the resistor 24 results in a potential drop at the input terminal 14. Consequently the potential of the output terminal 16 of the integrator 10 rises until it becomes equal to that at the input terminal 20. Therefore, another current flows from the integrator 10 into the comparator 11 through the output terminal 16, capacitor 17, resistor 12, diode 22 and output terminal 13. This current which flows through the capacitor 17 is, as is the case in the first embodiment, proportional to the voltage changing ratio at the input terminal 20. Then the input signal voltage applied to the input terminal 10 is maintained at the constant value.

When the input signal voltage is being reduced at a rate lower than a predetermined changing value, the potential at the output terminal 13 rises and the current flowing from the battery 23 into the comparator 11 through the resistor 24, resistor 12 and diode 22 decreases resulting in a rise of the potential at the terminal 14. As a result, the potential at the output terminal 16 falls and a current flows from the battery 23 into the integrator 10 through the resistor 24, capacitor 17 and output terminal 16. The current through the capacitor causes a voltage drop change in the resistor 24 and this change is detected at the terminal 13 as well as at the terminal 21. As described hereinbefore, when the input signal voltage is on the increase, maintained at a fixed value or on the decrease at a predetermined changing rate or less, since the potential at the output terminal 13 never exceeds the potential at the input terminal 14, some current flows into the comparator through the resistor 12 and the diode 22. Therefore, a negative voltage almost depending on the current flowing in the comparator through the resistor 12 is normally produced at the output terminal 13. If the input signal voltage is reduced at a predetermined changing rate or higher, the potential at the output terminal 13 rises and the device operates as described in the foregoing until the potential of the terminal 13 reaches a value equal to that of the input terminal 14. However, when the potential at the output terminal 13 becomes equal to, or further exceeds that of the input terminal 14, since no current flows from the battery 23 into the integrator 11 through the resistors 24 and 12 and diode 22, and further since the diode 22 is inserted between the terminals 13 and 14, the potential at the input terminal 14 does not vary and the output terminal 16 presents an output voltage corresponding to the predetermined changing rate. As a result, the non inverting input terminal 19 of the comparator 11 becomes higher in voltage than the inverting input terminal thereof and the voltage at the output terminal 13 becomes positive, thereby making it possible to detect the reduction of the input signal voltage at a predetermined changing rate or higher. Also, a voltage which is produced at the output terminal 16 of the integrator 10 has a certain changing rate from the time point at which the input signal voltage began to vary at a predetermined changing rate or higher.

It will be readily understood by those skilled in the art that apart from the above-described circuit for detecting the reduction of the input signal voltage at a predetermined rate or higher, a circuit for detecting the increase of the input signal voltage at a predetermined changing rate or higher can be constructed in a similar way as the embodiment shown in FIG. 4.

The circuit according to the invention which detects the voltage changing rate of the input signal in the manner mentioned above provides a very effective means manner mentioned above provides a very effective means for detecting the acceleration or deceleration of the wheels in a skid control system for vehicles.

It is needless to say that instead of the operational amplifiers which are used in the above-mentioned embodiments as the integrator 10 and comparator 11, other comparable means may be employed to produce the same effect. In addition, the comparator 11 may be an operational amplifier used as a summing amplifier.

What is claimed is:

1. A voltage changing rate detecting circuit comprising:
   an integrator circuit having first and second input terminals and an output terminal, one of the input terminals thereof being grounded and including a capacitor connected between said output terminal and the other input terminal,
   means for amplifying the difference between an input voltage signal and the output of said integrator including a comparator circuit with out positive feedback having first and second input terminals and an output terminal, one of the input terminals thereof being connected to the output terminals of said integrator circuit and the other of the input terminals thereof alone being adapted for receiving the input signal voltage whose rate changing is to be detected, and
   a feedback resistor connected between the output terminal of said comparator circuit and the said other of the input terminals of said integrator circuit.

2. A voltage changing rate detecting circuit comprising:
   an integrator circuit having first and second input terminals and an output terminal, one of the input terminals thereof being grounded and including a capacitor connected between said output terminal and the other input terminal,
   means for amplifying the difference between an input signal and the output of said integrator circuit including a comparator circuit without positive feedback having first and second input terminals and an output terminal, one of the input terminals thereof alone being connected to the output terminal of said integrator circuit and the other of the input terminals thereof being adapted for receiving the input signal voltage whose rate changing is to be detected,
   a resistor and a diode serially connected between said output terminal of said comparator circuit and said other of the input terminals of said integrator, the anode of said diode being connected at the side of said other of the input terminals of said integrator, and
   a constant voltage source connected to said other of the input terminals of said integrator for supplying a predetermined voltage to said integrator circuit.

3. A voltage changing rate detecting circuit comprising:
   a first differential amplifier having first and second input terminals and an output terminal,
   means connected said first input terminal of said first differential amplifier to a ground,
   a capacitor connected between said second input terminal of said first differential amplifier and said output terminal of said first differential amplifier for forming, together with said first differential amplifier, an integrating circuit,
   a second differential amplifier without positive feedback having first and second input terminals and an output terminal, with said first input terminal of said second differential amplifier connected to said output terminal of said first differential amplifier and said second input terminal of said second differential amplifier alone adapted for receiving a signal voltage whose changing rate is to be detected, and
   a resistive feedback circuit connected between said second input terminal of said first differential amplifier and said output terminal of said second differential amplifier.

4. A circuit as in claim 3 wherein said feedback circuit includes a serially connected diode and resistor.

5. A circuit as in claim 3 further including a constant voltage source connected to said second input terminal of said first differential amplifier.

* * * * *